350-167
SEARCH ROOM

April 4, 1961 R. C. VANSTRUM 2,977,850

REFLEX-REFLECTING SCREEN

Filed March 23, 1959

INVENTOR
ROBERT C. VANSTRUM
BY
Carpenter, Abbott, Coulter & Kinney
ATTORNEYS

United States Patent Office 2,977,850

Patented Apr. 4, 1961

2,977,850

REFLEX-REFLECTING SCREEN

Robert C. Vanstrum, White Bear Lake, Minn., assignor to Minnesota Mining and Manufacturing Company, St. Paul, Minn., a corporation of Delaware Filed Mar. 23, 1959, Ser. No. 801,406

3 Claims. (Cl. 88—82)

This application is a continuation-in-part of my application Serial No. 791,164, filed February 4, 1959, now abandoned.

This invention relates to improvements in the art of telecasting, and more particularly, to reflex-reflecting sheet material useful in the art of telecasting.

Many expedients have been suggested to present television viewers with a television picture having vividness of detail throughout without employing expensive stage settings. One such expedient involves employing a master camera in combination with a satellite camera, the master being directed upon a set where action takes place and the satellite being directed upon a miniature set (or photograph or projected moving picture) which supplies the background for the action. Theoretically, such an arrangement offers what appears to be the greatest promise in getting vividness and realism in background areas of a television picture without leaving the studio to achieve the result. It permits slight differences in brightness between, for example, ocean whitecaps, white sand and a white bathing suit to be distinctly apparent to the televiewer, whereas other arrangements for telecasting a picture have tended to cause the whiteness of such objects to blend into a single blur of whiteness. It makes possible scenes of accurate and fine, plainly-visible detail, which could not be done realistically in the studio before (e.g., scenes having a background of a beach, snow, desert, darkened jungle, a street at nighttime, a darkened room, etc.). It permits panning, close-ups, different angles of view, etc. However, certain optical requirements arise because of the camera arrangement necessary to achieve this result; and these optical requirements have heretofore been stumbling blocks to the full success of this improved technique.

It is vital for the master camera trained on the main set where action takes place to pick up a limited band of wave lengths of essentially uniform observed intensity from all areas of the set background not masked by an actor or other object present on the main set. The picture created by this limited band of wave lengths (with blank spaces where an actor or object is present) is converted to electronic signals which are utilized to cause a printing (i.e., telecasting) of the picture picked up by the satellite camera in only those areas representative of the picture created by the limited band of wave lengths from the main set. Areas of the picture picked up by the satellite camera corresponding to areas occupied by an actor or object in the main set are blocked so that they are not telecast. Thus, the televiewer receives a composite picture of the actor or objects from the main set superimposed in the setting picked up by the satellite camera. It is clear that such an arrangement for television photography permits different lighting to be used for different portions of a composite picture received by the viewer, thus enhancing the achievement of detail and realism without incurring great expense.

The success of the technique, however, is highly dependent on the main camera receiving a selected limited band of wave lengths of essentially uniform observed intensity from all areas of the background of the main set, including horizontal (floor) as well as vertical (wall) areas thereof (and few or no wave lengths within this limited band from the actors or objects in the main set).

This invention provides a flexible sheet material which permits such a result to be accomplished. The flexible sheet material hereof exhibits substantially the same reflex-reflection properties at great angles to normal as well as at normal or near normal angles. Insofar as observed intensity is concerned, my sheet material exhibits essentially the same brilliance of reflex-reflection of light back in a cone toward its source regardless of the angle at which incident light strikes the material.

Further provided by this invention is a highly protuberated sheet material which exhibits extremely brilliant reflex-reflection in the relatively limited band of visible wave lengths known as the indigo blue range (e.g., 4000 to 5200 A.), but which is relatively absorptive of all other visible wave lengths.

The principles and detail of the invention will be explained in connection with a drawing, made a part hereof, wherein.

Figure 1:
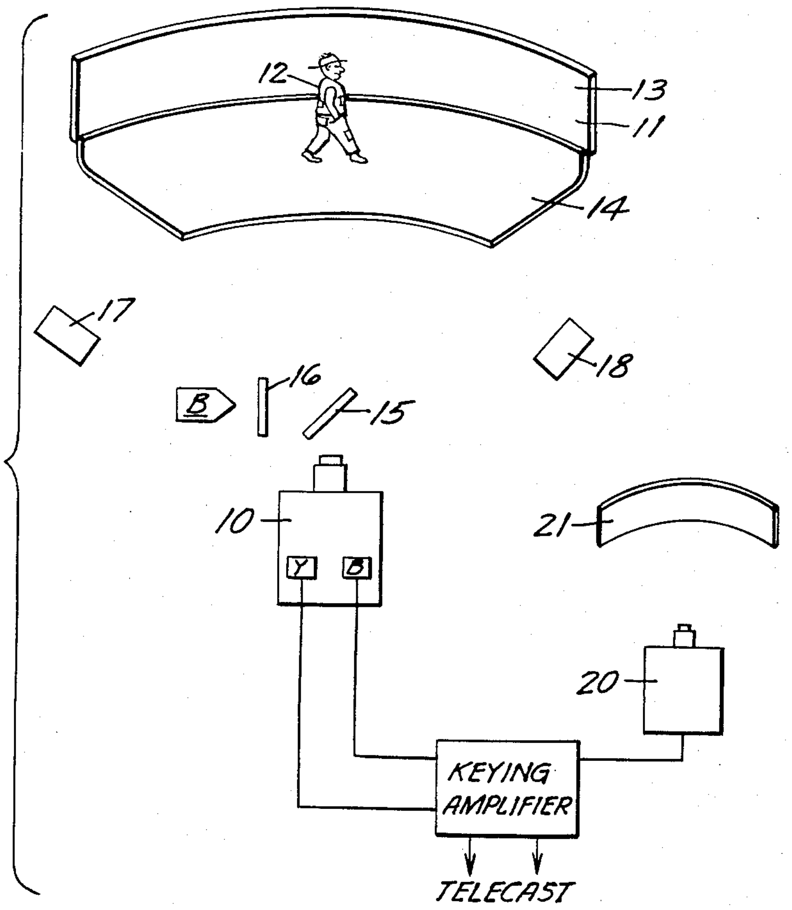
Figure 1 is a schematic illustration of the relationship of various elements of telecasting equipment employed to obtain the results here discussed.

The relationship of various elements of apparatus schematically illustrated in Figure 1 will first be explained so as to orient the reader.

A master camera 10 is directed upon main set 11 where the main action takes place such as movement by an actor 12. The set 11 exhibits essentially uniform reflex-reflecting intensity to camera 10 throughout its entire area, e.g., throughout wall portions 13 and floor portions 14 thereof.

While camera 10 is operating, a satellite camera 20 serves to pick up a background image from miniature set 21, which may comprise a miniature (or actual size) stage setting or a mere photograph (or a projected picture, or even a series of photographs such as projected from a movie film). Camera 10 and camera 20 are synchronized through servomechanisms so that movement of camera 10 is accompanied by a corresponding relative (but smaller) movement by camera 20.

Immediately in front of camera 10 is located a half-silvered mirror 15 at an angle of approximately 45 degrees to the plane of the lens of camera 10. At right angles to camera 10 is a light source B directed upon the half-silvered mirror 15 so that a significant amount of light from light source B is reflected to the stage setting background 11, including the wall portion 13 as well as the floor portion 14 thereof. Preferably this light source is of indigo blue light (e.g., 4000 to 5200 A.) having a peak wave length of about 4600 A. While light source B may include all wave lengths of visible light, it is essential that the reflex-reflecting properties of wall 13 and floor 14 be limited essentially to a relatively narrow range of wave lengths (e.g., indigo blue). If desired, a filter 16 may be juxtaposed between half-silvered mirror 15 and source B. Generally such a filter will be employed where light source B includes a variety of wave lengths of light, the filter serving to essentially limit transmission to a relatively narrow band of wave lengths. Flood lamps 17 and 18 are directed upon the actor or action taking place before the background 11.

In operation, light from source B strikes half-silvered mirror 15 and is reflected toward wall 13 and floor 14, which in turn serve as brilliant reflex-reflectors of essentially uniform intensity, regardless of the angle at which incident light strikes them, and return brilliant cones of light from all portions thereof toward the lens of camera 10. A significant amount of this reflex-reflected light passes through half-silvered mirror 15 into camera 10. Simultaneously, stage lighting falling upon character 12 (or object) is reflected in a variety of wave lengths and picked up by camera 10, a significant amount passing through half-silvered mirror 15 so as to be available for pickup by the camera 10. The light received by the image orthocon tube of camera 10 is channeled by two cells, Y and B, into separate circuits. (The brightness of the character 12 or other object in the stage setting is readily improved or corrected by adjustments well known to the art.) Cell B serves to pick up wave lengths of the relatively limited range returned by the wall and floor portions of the background, whereas cell Y picks up remaining wave lengths, e.g., light reflected from character 12 or other object before the screen 11. In other words, cells Y and B respond selectively to the light of the image picked up by the camera, separating the impulses representative of the light into two channels. The signal supplied by cell Y to the keying amplifier for telecasting is telecast essentially as received by the keying amplifier (i.e., the actor or objects before background 11 are telecast directly), whereas the signal supplied by cell B (representative of all areas of background 11 except masked out portions occupied by the charcter 12) serves as a doctoring signal causing signals of the image picked up by camera 20 to be telecast only in those areas representative of the reflex-reflected light from background screen 11. The result is that the image picked up by satellite camera 20 is telecast in all areas except those areas in which an actor or an object is present before screen 11 and picked up by camera 10. The viewer receives a composite picture of fine detail and delineation which contributes to realism.

In order for this system of telecasting to operate efficiently, it is vital that the image from the background areas of screen 11 be essentially uniform in intensity in all areas and of a limited wave length. To this end, reflex-reflecting materials must provide brilliant reflex-reflection at high angles to normal as well as angles normal to their surface, i.e., light reflected from floor area 14 must be of essentially the same observed intensity to the eye of camera 10 as light reflected from wall portions 13. The background and floor should be of substantially the same observed brightness in order to provide a uniform effect.

Figure 2:
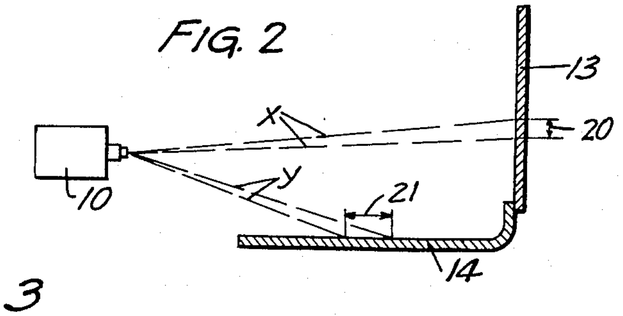
Figure 2 is a schematic side view illustrating the essentially uniform, observed intensity of reflex-reflected light from all portions of a floor and wall within the picture taken by a camera.

Referring to Figure 2, reflex-reflected light from segment 20, for example, of wall 13 and reflex-reflected light from relatively larger segment 21 of floor 14 should be approximately equal to the eye or lens of the television camera 10, assuming the illustrated small angles (or cones) $x$ and $y$ to be equal. In this sense, the observed intensity of reflex-reflection exhibited by my sheet material suprisingly is essentially the same throughout angles ranging from normal to about 85 degrees from normal to its surface. In addition, the intensity of reflection throughout this range of angles is high, being several hundred times that of a painted surface of like color. Such a combination of properties in a single flexible reflex-reflecting sheeting has never, insofar as I am aware, been accomplished heretofore. All sheeting that I am familiar with has exhibited a substantial difference in its observed reflex-reflective properties between angles near normal and those nearly horizontal to the sheeting. In fact, the principles and theory underlying reflex-reflection would seem to indicate that a sheeting of the behavior properties elucidated above would be impossible to prepare.

I have found, however, that a sheeting having irregular protuberances on its surface and a multiplicity of minute reflex-reflecting optical combinations disposed over its protuberated surface surprisingly satisfies the critical requirements aforediscussed. This sheeting may easily be cut to various sizes in the fabrication of a set or screen as discussed above.

Figure 3:
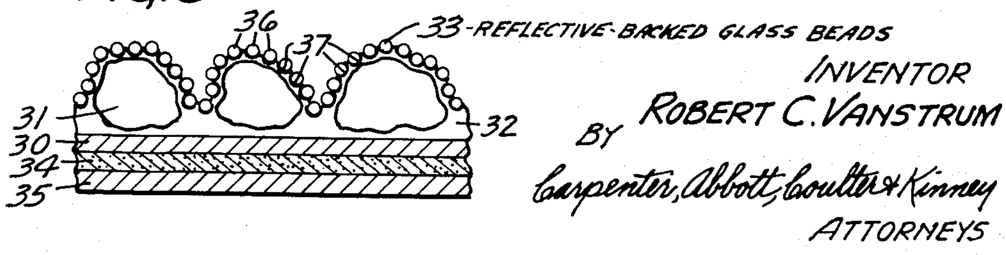
Figure 3 is a magnified diagrammatic cross-sectional view of a fragment of the flexible reflex-reflective sheet material of this invention.

Referring to Figure 3, this sheeting comprises a sheet backing 30, a layer of relatively rigid core members 31 firmly bonded to the backing by a tough abrasion-resistant binder 32, and a multiplicity of minute reflex-reflecting complexes 33 bonded on the projecting surfaces of the core members. On the side of the backing opposite the irregular protuberances created by the core members and their associated coatings of reflex-reflecting complexes, a coating 34 of high strength water-insoluble, normally tacky and pressure-sensitive adhesive substance is preferably applied, so as to permit the user to attach the sheeting to floors or walls with convenience. This coating is normally protected during shipment and storage with a disposable low-adhesion, removable, temporary liner 35.

Various dimensionally-stable sheet materials, preferably flexible materials such as tough organic films (e.g. polyethylene terephthalate), laminates, cloths (e.g. especially those impregnated or treated using such teachings as in Kugler and Oakes United States Patent 2,357,355, or Oakes United States Patent 2,357,350), etc., are suitable for use as the backing sheet of the structure. Sheet materials such as plywood may be used, if desired. Where adhesion of bond material 32 or pressure-sensitive adhesive layer 34 to a selected backing is low, suitable priming treatments or adhesives may be used to improve the strength of bond between the layers as well understood in the adhesive art.

The core members 31 may assume a variety of shapes and have varying degrees of pits and irregularities on their surfaces. They may be generally spherical, elliptical, cubic, etc. Usually core materials are formed by crushing lithic materials such as rock, gravel, etc., but other materials may be used so long as the core members are relatively rigid, i.e., sufficiently rigid to hold the applied reflex-reflecting complexes in position. The size of core elements is as small as possible consistent with the requirement of a suitable protuberated surface with reflex-reflecting complexes on the projecting portions of the protuberances. As a practical matter, this means that core members small enough to pass through a 200 mesh screen are impractical to employ since they fail to provide the necessary protuberances for the structure. Cores in the range of about 100 mesh to 200 mesh, may be used where precautions are taken in forming the structure and extremely minute (e.g., 20 microns diameter or so) reflex-reflecting complexes are employed. Preferably, however, cores in a size range small enough to pass through a 10 mesh screen and be retained on a 40 mesh screen are employed, since the properties to be exhibited by the end product are more readily controlled when using this size range. However, cores as large as ¼ inch are suitable. While still larger cores may be used to form sheeting of satisfactory optical properties, the larger particles serve to unduly increase the weight of the sheeting and render it less comfortable for actors to walk upon.

For the bond material holding the cores in place on the backing, we preferably employ curable or thermosetting resin compositions which are non-brittle and water-insoluble. Alkyds, epoxies, etc., which cure to a tough flexible state are particularly suitable. But various other materials (e.g., asphaltic resins, rubber-base resins) may be used so long as the bond is adequately firm to the backing and holds the core members firmly in position.

The reflex-reflecting complexes over the projecting surfaces of the core members consist essentially of small (e.g., up to about 10 mils diameter) glass beads 36 (or space coated beads) of approximately 1.9 refractive index (or an effective index of approximately 1.9), and an underlying specular-reflecting means 37 in optical connection therewith. As illustrated in Figure 3, the underlying specular-reflecting means preferably takes the form of an essentially hemispherical light-reflecting coating in optical connection with the back extremity of each glass bead or sphere lens. Since the reflex-reflecting complexes are crowded and compacted in essentially a monolayer over the projecting side and top surfaces of the core members, it is preferable to employ glass beads of a diameter no larger than about 150 microns, beads as small as 15 microns or so being useful.

For indigo blue reflex-reflection as preferred, beads of a composition transmissive to wave lengths in the range of about 4000 A. to 5200 A. and relatively absorptive of other wave lengths should be used, as illustrated in the specific example to follow.

As in the case of the bonding resin holding the core members to the backing, so also are a wide variety of compositions useful to bond the beads and their optically associated reflectors to the projecting surfaces of the core members; however, it is preferable to employ a pigment (e.g., indigo blue) in the bond for the beads so as to obviate, insofar as possible, other wave lengths than those transmitted by the beads from being reflected toward the camera lens in the use application aforediscussed. Flattening agents such as silica aerogel may be incorporated in this binder, and contribute to the reduction of glare from widely scattered light sources; however, the problem of glare is not serious with this sheet structure as the surface is so irregular that no pattern of glare is created in the use application aforediscussed. It is very important to avoid flooding of the bonding material used to affix the reflex-reflecting complexes on the irregular surfaces of the core members, since anything tending to smooth out the surface of the structure detracts from the high angularity required.

As a specific example of a reflex-reflecting sheet material which exhibits high brillliancy and essentially uniform brilliancy of reflex-reflection essentially regardless of the angle at which incident light is directed upon the same, the following is offered:

A flexible essentially dimensionally stable sheet backing consisting of resin-impregnated cotton drill cloth was coated with a high strength, water-insoluble, normally tacky and pressure-sensitive adhesive of the rubber-resin type using an adhesive solution such as prepared according to Example 1 of U.S. Patent 2,410,053 to Drew. Approximately 75 grains of adhesive solution per 24 square inches of the backing were applied and the solvent evaporated. A polyethylene-coated paper was then applied over this pressure-sensitive adhesive surface as a temporary removable protective liner.

On the other side of the backing was coated a curable epoxy resin solution consisting of about 30 parts of "Epon 828" (a liquid diglycidyl ether of bis (4-hydroxy phenyl) dimethylmethane melting at about 8–12° C. and having an epoxide equivalent of about 190–210), approximately 70 parts of an epoxy reactive curing agent, "Versamid 125" (a polyamide resin formed by condensing a dimerized or trimerized vegetable oil unsaturated fatty acid and an aryl or alkyl polyamine), and sufficient methyl isobutyl ketone to dilute the mixture to about 90% solids. This resin solution was applied at a thickness to give a dry film approximately 10 mils thick.

Crushed graystone rock of a size small enough to pass through a 10 mesh screen but large enough to be retained on a 20 mesh screen was then "choke" coated (i.e., coated at maximum coverage) on to the above liquid bond. Excess rock was removed by briefly holding the structure in a vertical position and allowing the excess to fall off. Then the structure was placed on a support surface and allowed to cure, which took place in something slightly over 24 hours at room temperature. If an accelerated cure is desired, a cure time of approximately 8 hours at 150° F. may be used.

Next a bead bond coating was sprayed over the protuberating rock particles on the backing so as to give a bond thickness of solids of approximately 15 to 20 microns over all surfaces of the protuberating rock particles. The sprayable mixture consisted of approximately 50 parts of the aforementioned epoxy reactive curing agent, 25 parts of aforementioned epoxy resin, 25 parts of "Epon 1001" (a solid epoxy resin having a melting point according to the Durrans mercury method of approximately 64 to 76° C. and an epoxide equivalent of about 450 to 525), and 5 parts of phthalcyanine blue pigment, the mixture being diluted with methyl ethyl ketone to approximately 50% solids.

Drying of solution from the above bead bond coating (usually approximately 15 to 30 minutes of air drying) left a residual film coating of high tackiness. Then silvered indigo-blue beads were sprinkled over the tacky coating of the protuberated surface in excess, and the sheet material was shaken back and forth to cause the beads to cascade between protuberances and slightly embed themselves in the tacky coating. This gave a maximum coverage of the silvered blue beads over the coated irregular surfaces of the protuberances.

The indigo blue glass beads had a refractive index of about 1.9, were of a size between 60 and 90 microns in diameter, and were formed from cobalt blue colored glass having a composition analysis, in mol percent, as follows: 3.55% $B_2O_3$, 38.41% $TiO_2$, 22.92% $SiO_2$, 12.63% $Na_2O$, 1.47% $K_2O$, 18.42% BaO, and 2.60% CoO. The beads were relatively absorptive of visible light waves outside the range of approximately 4000 to 5200 Angstrom units, and exhibited a peak of light transmission around 4600 Angstrom units.

They were silvered as follows: Approximately 300 parts by weight of beads were added to about 1200 parts of water containing about 12 parts of silver nitrate in a stainless steel mixing vessel. To this was added 20 parts of a 28% solution of ammonium hydroxide while stirring the mixture. Then the mix was allowed to stand about one minute. About 10 parts of dextrose in 32 parts of water were next added to the mixture, followed immediately by the addition of a solution of about 6 parts potassium hydroxide in 32 parts of water. Reaction was allowed to proceed for up to about 5 minutes so as to obtain a chemical deposition of silver on the bead surfaces. During this reaction the beads were stirred or agitated. After reaction, the water and components dissolved therein were removed from the coated beads and the coated beads washed with tap water and rinsed in acetone and dried at about 300° F. with mild agitation for about 5 minutes. (If desired, suitable reflectors may be formed using vapor deposition techniques.)

Excess beads sprinkled on the surfaces of the structure were then removed by briefly holding the sheet in a vertical position. After approximately 48 hours or slightly longer at room temperature, the bead bond was sufficiently cured to hold the beads rigidly in place. If more rapid curing is desired, approximately 8 hours at 150° F. gives satisfactory results.

The beaded surface of the protuberances was then dipped for about 30 seconds into an etching solution consisting of about 25 parts of potassium dichromate, 92 parts of concentrated sulfuric acid and about 3000 parts of water. This particular treatment served to remove the silver coating from the portion of the beads not embedded in the dried binder (i.e., it served to remove approximately the outer hemispherical portion of the silver coating not embedded in the binder). The structure was then thoroughly flushed with water and dried.

Incident light striking the surface of this structure at angles approximately 85 degrees from normal is reflected back essentially as intensely, insofar as a viewer is concerned, as incident light reflected from the structure in a reflex-reflective fashion at all angles closer to normal, including normal.

The sheeting aforedescribed is conveniently applied over floor areas and curved to cover lines of juncture between floor and wall areas. It may be used as both the floor and wall covering to provide the required background for the success of the telecasting technique aforediscussed. However, it is possible to employ other types of reflex-reflective sheeting for wall areas in combination with floors covered with the sheeting hereof to gain satisfactory results.

While primarily adapted for use in the specialized field of telecasting described herein, it is also appreciated that other reflex-reflective uses for this sheeting are possible. Thus it may find utility in roadside advertising, road-delineation or marking, etc., where its wide angularity and brilliance of reflex-reflection would render it more versatile than many heretofore known reflex-reflective materials. Indeed, the sheeting hereof and the principles aforediscussed in connection with telecasting may also be used in the art of making economical movies, kinescopes, etc.

I claim:

1. A brilliantly reflex-reflecting sheet material characterized by exhibiting substantially equal observed brilliance of reflex-reflection throughout angles from normal to 85 degrees from normal, and being easily cut to size and particularly adapted for use in forming screens as herein described, said sheet material comprising a continuous backing member, a layer of relatively rigid particles in the range of about ¼ inch to 200 mesh firmly bonded to said backing, and a multitude of minute reflex-reflecting complexes bonded over the projecting side and top surfaces of said particles, said complexes comprising transparent glass beads of a refractive index of approximately 1.9 with reflective means optically associated with the underlying extremities thereof.

2. A brilliantly reflex-reflecting sheet material characterized by exhibiting substantially equal observed brilliance of reflex-reflection throughout angles from normal to 85 degrees from normal, and being easily cut to size and particularly adapted for use in sets for telecasting as herein described, said sheet material comprising a continuous backing member, a layer of relatively rigid particles in the range of about ¼ inch to 200 mesh firmly bonded to said backing, and a multitude of minute reflex-reflecting complexes bonded over the projecting side and top surfaces of said particles, said complexes comprising minute sphere lenses of a refractive index of approximately 1.9 with reflective means optically associated with the underlying extremities thereof, said sphere lenses being highly transmissive of wave lengths of indigo blue light between approximately 4000 and 5200 Angstrom units, and highly absorptive of essentially all other wave lengths in the visible spectrum.

3. In a combination comprising a main television camera focused upon action before a reflex-reflective screen, the improvement wherein at least the floor portion of said screen comprises a brilliantly reflex-reflecting sheet characterized by exhibiting substantially equal brilliance of reflex-reflection throughout angles from normal to 85 degrees from normal, said sheet comprising a layer of relatively rigid particles in the range of about ¼ inch to 200 mesh firmly bonded to a backing, and a multitude of minute reflex-reflecting complexes bonded over the projecting side and top surfaces of said particles, said complexes comprising minute sphere lenses of a refractive index of approximately 1.9 with reflective means optically associated with the underlying extremities thereof.

No references cited.